United States Patent
Suehira

(10) Patent No.: US 7,281,204 B1
(45) Date of Patent: Oct. 9, 2007

(54) HUB DOCUMENT PREPARATION METHOD

(75) Inventor: Seishi Suehira, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/447,052

(22) Filed: Nov. 23, 1999

(51) Int. Cl.
*G06F 15/00* (2006.01)
*G06F 17/30* (2006.01)

(52) U.S. Cl. .............. 715/513; 715/522; 715/523; 710/200; 710/203; 710/204

(58) Field of Classification Search ........ 715/511, 715/513, 514, 515, 522–523; 707/200, 203, 707/204
See application file for complete search history.

(56) References Cited

U.S. PATENT DOCUMENTS

| | | | | |
|---|---|---|---|---|
| 5,325,484 A | * | 6/1994 | Motoyama | 345/501 |
| 5,629,846 A | * | 5/1997 | Crapo | 708/705 |
| 5,655,130 A | * | 8/1997 | Dodge et al. | 715/511 |
| 6,014,680 A | * | 1/2000 | Sato et al. | 715/513 |
| 6,061,697 A | * | 5/2000 | Nakao | 715/513 |
| 6,101,511 A | * | 8/2000 | DeRose et al. | 715/514 |
| 6,202,072 B1 | * | 3/2001 | Kuwahara | 715/513 |
| 6,377,956 B1 | * | 4/2002 | Hsu et al. | 707/104.1 |
| 6,490,603 B1 | * | 12/2002 | Keenan et al. | 715/513 |
| 6,507,858 B1 | * | 1/2003 | Kanerva et al. | 715/515 |
| 6,635,088 B1 | * | 10/2003 | Hind et al. | 715/513 |
| 6,922,697 B1 | * | 7/2005 | Suehira | 707/102 |

FOREIGN PATENT DOCUMENTS

| | | |
|---|---|---|
| JP | 8-16576 | 1/1996 |
| JP | 9-138800 | 5/1997 |
| JP | 9-185633 | 7/1997 |
| JP | 10-187680 | 7/1998 |

OTHER PUBLICATIONS

World Wide Web Consortium, XML Schema Part I: Structures, W3C Working Draft (May 6, 1999).*
World Wide Web Consortium, Document Definition Markup Language (DDML) Specification, Version 1.0, W3C Note (Jan. 19, 1999).*
Japanese Patent Office Action mailed Feb. 14, 2006 corresponding to Japanese Patent Application No. HEI 11-157066.
"SGML Oasys V1.1 for Windows® User's Guide Microsoft® Windows®", 1st ed., Japan, Fujitsu Limited, 1st ed., p. 1-6, 79-82, Feb. 28, 1996.
Japanese Patent Office "Notice of Reasons for Rejection" dated Jul. 25, 2006 for corresponding Japanese Patent Application No. HEI 11-157066.

* cited by examiner

*Primary Examiner*—Doug Hutton
*Assistant Examiner*—Chau Nguyen
(74) *Attorney, Agent, or Firm*—Staas & Halsey LLP

(57) ABSTRACT

The invention provides a hub document preparation method which collects a plurality of external files and attachment files to be included in a structured document of a hub document format to allow a hub document to be prepared readily, to reduce the burden to a document preparing person, and to augment the operation and efficiency of preparing a hub document.

63 Claims, 8 Drawing Sheets

```
<! DOCTYPE item system "example. dtd"[
<! ENTITY      front. sgm      system "front. sgm">
<! ENTITY      t0000010.sgm    system "t0000010..sgm ">
<! ENTITY danger.gif system    "danger. gif" ndata GIF
<! ENTITY warning.gif system   "warning. gif" ndata GIF
<! ENTITY caution.gif system   "caution. gif" ndata GIF
<! ENTITY FUJITSU.gif system   "FUJITSU.gif" ndata GIF
]>
< item hytime="hydoc" dockind="test">
&front. sgm ;
< body>
< h0><title> TEST
&t0000010. sgm ;
</h0>
</body>
</item>
```

HUB DOCUMENT PREPARATION METHOD

BACKGROUND OF THE INVENTION

1) Field of the Invention

This invention relates to a hub document preparation method for preparing a single structured document of the hub document format such as, for example, an SGML (Standard Generalized Markup Language) document from a plurality of non-structured documents such as, for example, documents prepared on a word processor.

2) Description of the Related Art

Various structured documents are conventionally known and include an SGML (Standard Generalized Markup Language) document and an XML (Extended Markup Language) document in which document contents are represented in a text format excluding layout information and so forth from document data. Such structured documents as an SGML document and an XML document allow definition of a logical structure of the document by adding a mark called tag for identifying the structure of the document and are progressively spread as standard language documents for storage/search or exchange of a document.

FIG. 8 illustrates a structure of an SGML document. In the following, a structured document is described taking an SGML document as an example with reference to FIG. 8.

Generally, an SGML document 20 is composed of an SGML declaration 21 which describes various references such as types of codes used in the document, a DTD (Document Type Definition) 22 which defines mutual relationships of document elements, that is, a document structure, and a document instance 23 representative of document contents.

The DTD 22 defines tags to be applied to elements of the document such as an index, the body of the document, and a list. More particularly, the DTD 22 includes element declarations which define the elements of the document, relationships of inclusion of elements, an order in which the elements are to be arranged, a number of times of appearance of each element and so forth, attribute declarations which define attributes of the elements, entity declarations which declare methods of taking special characters, pictures or the like into the document, and so forth. The DTD 22 allows definitions of memberships, an order of appearance, numbers of times of appearance and so forth of tags in a tree structure.

In order to prepare the SGML document 20, a document structure of the SGML document 20, that is, the DTD 22, is prepared or acquired first, and then the document instance 23 which fits with the DTD 22 is prepared.

The document instance 23 may have a graphic file, which includes graphic information, or a like file attached thereto. In the following description, a file attached to the document instance 23 in this manner is referred to as attachment file.

Upon preparation of the SGML declaration 21 or the DTD 22, various definition contents (declarations and so forth) may be described directly in the SGML declaration 21 or the DTD 22 as described above, or such definition contents may be described in an external file (external entity) 21a or 22a stored in an external area 25 in advance such that the external file 21a or 22a may be designated by the SGML declaration 21 or DTD 22 (external entity declaration).

Though not illustrated in FIG. 8, upon preparation of the document instance 23, document contents of the document instance 23 may be described in an external file in advance so as to allow the external file to be designated by the document instance 23 of the SGML document 20 (external entity declaration) similarly as upon preparation of the SGML declaration 21 or DTD 22.

The external file designated by the external entity declaration by the document instance 23 may have an attachment file attached thereto. In this instance, an external entity declaration for declaring the entity of the attachment file is prepared.

FIG. 9 illustrates a structure of an SGML document (hub document format structured document) 30 of the hub document format. Referring to FIG. 9, contents of an SGML declaration and a DTD are prepared and described in external files (external entities) 31 and 32, respectively, while a plurality of (two in FIG. 9) document contents (document instances) are prepared and described in external files 33a and 33b, respectively, and the external files 31, 32, 33a and 33b are designated (external entity declaration) by a hub document 35 to prepare the single SGML document 30 of a hub document format.

The SGML document 30 of such a hub document format as described above is suitable as a document wherein document contents are described in detail in a great number of parts, for example, such as a maintenance manual or the like, and is generally suitable to combine contents (instances) of a plurality of documents prepared on a word processor or a like document preparing system into a single SGML document such as the SGML document 30.

It is to be noted that an authoring tool in most cases prepares one SGML document by adding an SGML declaration and a DTD to one document instance (one file) as seen in FIG. 8.

Upon preparation of such a hub document 35 as described above, the preparing person first collects a plurality of external files to be included into the SGML document 30 of the hub document format, and then prepares entity declarations (ENTITY statements) for individually referring to the entities of the external files.

However, in such a conventional hub document preparation method as described above, in order to designate the external files with the external entity declarations, the preparing person must collect necessary external files.

For example, in order to designate the external files 31, 32, 33a and 33b, which are discretely located on the computer system and in which document instances and so forth are stored individually, with external entity declarations, the external files 31, 32, 33a and 33b must be located after the stored locations of them are checked. Therefore, the conventional hub document preparation method described above has a subject to be solved in that the operation just described is cumbersome and makes a heavy burden to the preparing person, and besides much time is required for the preparation of the hub document 35 and the operation efficiency is low.

Further, where a document instance has an attachment file such as a graphic file added thereto, in order to prepare an entity declaration (ENTITY statement) for referring to the entity of the attachment file, not only an external file of the document instance must be collected but also the stored location of the attachment file must be checked to collect the attachment file. Consequently, the conventional hub document preparation method described above has another subject to be solved in that the presence of such an attachment file as described above further increases the burden to the preparing person and increasing time is required for preparation of the hub document 35 and besides the operation efficiency is deteriorated.

SUMMARY OF THE INVENTION

It is an object of the present invention to provide a hub document preparation method which facilitates collection of a plurality of external files and attachment files to be included in a structured document of a hub document format to allow a hub document to be prepared readily to reduce the burden to a document preparing person and augment the operation efficiency.

In order to attain the object described above, according to the present invention, there is provided a hub document preparation method for preparing a hub document which describes entity declarations for referring to entities of a plurality of structured documents individually corresponding to a plurality of non-structured documents in order to prepare a single hub document format structured document from the plurality of non-structured documents, comprising the steps of setting in advance an original document storage area for storing the non-structured documents and a structured document storage area for storing structured documents obtained by conversion of the non-structured documents, storing, each time one of the plurality of non-structured documents to be included in the hub document format structured document is prepared or edited, the non-structured document into the original document storage area, converting the non-structured documents stored in the original document storage area into structured documents and storing the structured documents into the structured document storage area, acquiring document names of the plurality of structured documents stored in the structured document storage area and preparing entity declarations for referring to entities of the structured documents, and preparing the hub document based on the entity declarations regarding the structured documents.

The hub document preparation method may be constructed such that, in addition to the original document storage area and the structured document storage area, an attachment file storage area for storing attachment files attached to the non-structured documents and entity declarations regarding the attachment files is set in advance, and, upon preparation or editing of any of the plurality of structured documents to be included in the hub document format structured document, if an attachment file is attached to the non-structured document, then the attachment file is stored into the attachment file storage area and an entity declaration for referring to an entity of the attachment file is prepared and stored into the attachment file storage area, and then the entity declarations regarding the attachment files stored in the attachment file storage area are extracted and the hub document is prepared based on the entity declarations regarding the attachment files and the entity declarations regarding the structured documents.

Alternatively, the hub document preparation method may be constructed such that, in addition to the original document storage area and the structured document storage area, an attachment file storage area for storing attachment files attached to the non-structured documents and an entity declaration storage area for storing entity declarations regarding the attachment files are set in advance, and, upon preparation or editing of any of the plurality of non-structured documents to be included in the hub document format structured document, if an attachment file is attached to the non-structured document, then the attachment file is stored into the attachment file storage area and an entity declaration for referring to an entity of the attachment file is prepared and stored into the attachment file storage area, and then the entity declarations regarding the attachment files stored in the entity declaration storage areas are extracted and the hub document is prepared based on the entity declarations regarding the attachment files and the entity declarations regarding the structured documents.

The entity declarations of the structured documents may have file names same as file names of the original non-structured documents individually corresponding to the structured documents. The entity declarations regarding the attachment files stored in the entity declaration storage area may have file names same as file names of the non-structured documents to which the attachment files are attached. The attachment files may be graphic files each of which includes graphic information.

The structured documents may be Standard Generalized Markup Language documents whose document structure is defined by a Document Type Definition.

With the hub document preparation method described above, the following advantages can be anticipated.

1) Since only it is required upon preparation of a hub document to refer to a predetermined storage area or areas, a hub document can be prepared rapidly and readily, and the operation burden to a preparing person is light and a high operation efficiency can be achieved.

2) Since a hub document can be prepared automatically, it can be prepared rapidly and readily, and the operation burden to the preparing person is light and a high operation efficiency can be achieved.

3) Since, from document names of structured documents stored in the structured document storage area, entity declarations for referring to the entities of the structured documents or entity referring statements for referring to the entities of the structured documents can be prepared readily, a hub document can be prepared rapidly and readily, and the operation burden to the preparing person is light and a high operation efficiency can be achieved.

4) Since, upon editing of a structured document, the structured document of the object of editing can be searched out readily from the structured document storage area, such structured documents can be managed readily.

5) Since, upon preparation of a hub document, an entity declaration stored in the attachment file storage area can be extracted readily, the hub document can be prepared rapidly and readily, and the operation burden to the preparing person is light and a high operation efficiency can be achieved.

6) When, upon editing of a hub document, an attachment file used is to be edited or in a like case, the attachment file of the object of editing can be searched out readily from the attachment file storage area, and consequently, a high operation efficiency can be achieved in the editing operation.

7) Since an entity declaration for referring to the entity of an attachment file can be prepared automatically, the operation burden to the preparing person is further decreased and the working efficiency is augmented.

8) Since, upon preparation of a hub document, an entity declaration stored in the entity declaration storage area can be extracted readily, the hub document can be prepared rapidly and readily, and the operation burden to the preparing person is light and a high operation efficiency can be achieved.

9) Since, when editing, search for bugs or the like of a hub document is performed, an entity declaration or the like regarding a desired non-structured document can be searched out readily, a high working efficiency can be achieved in the operation.

10) Since, when editing, search for bugs or the like of a hub document is performed, an entity declaration or the like regarding a desired attachment file can be searched out readily, a high working efficiency can be achieved in the operation.

11) A hub document including a graphic file can be prepared readily.

12) An SGML document of a hub document format can be prepared rapidly and readily.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 6 is a view showing an example of a description of a hub document prepared by the hub document preparation method of the embodiment of the present invention;

DESCRIPTION OF THE PREFERRED EMBODIMENT

Figure 1:
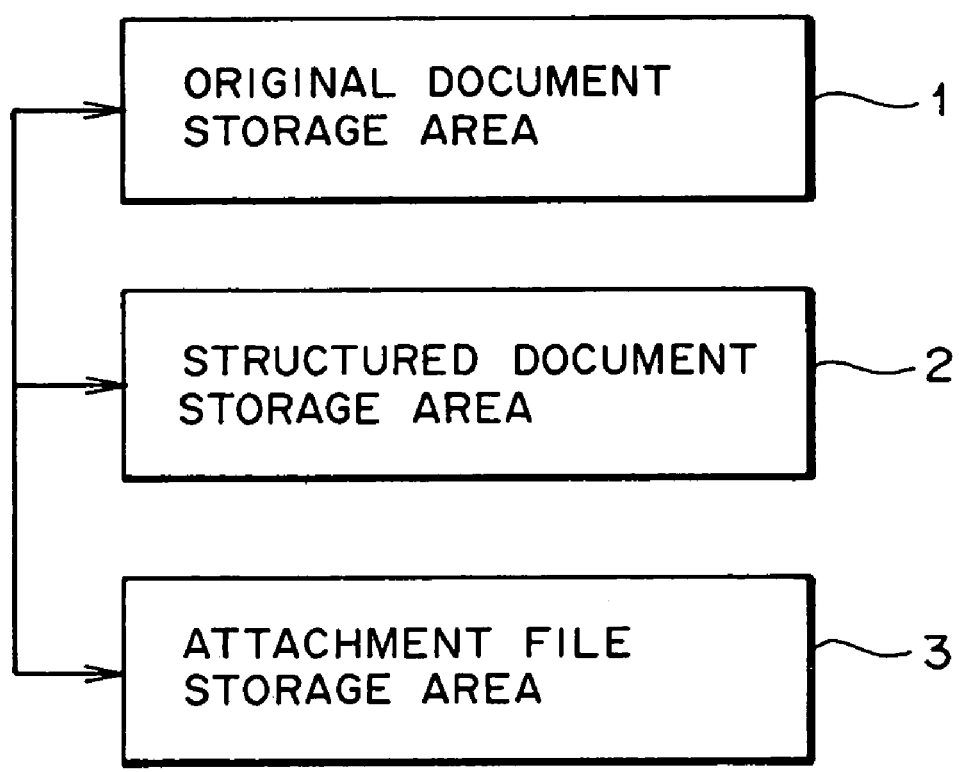
FIG. 1 is a diagrammatic view illustrating a hub document preparation method according to an embodiment of the present invention.
Figure 2:
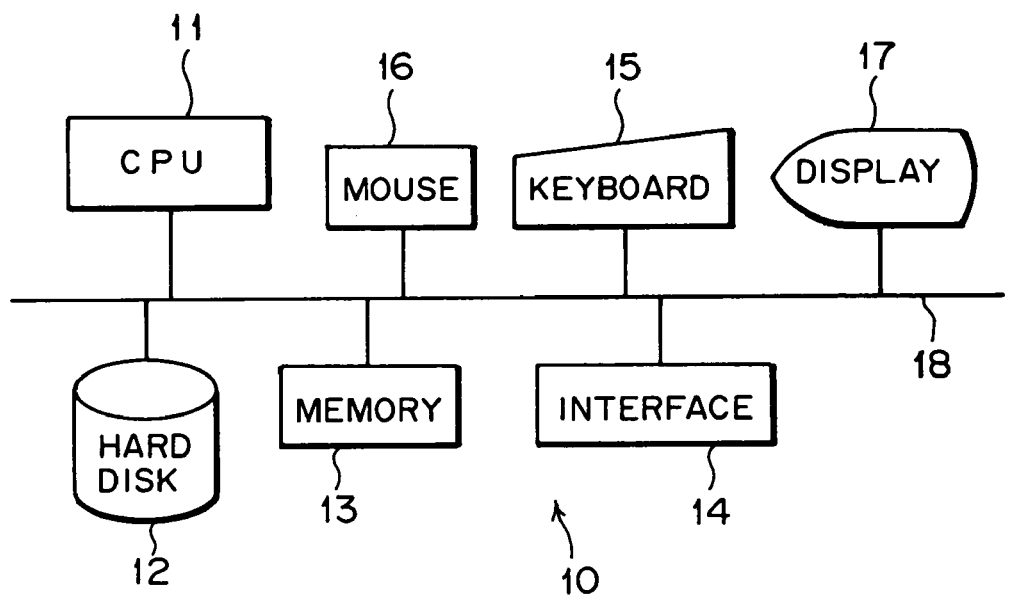
FIG. 2 is a block diagram showing a configuration of a system (computer system) to which the present invention is applied.
Figure 3:
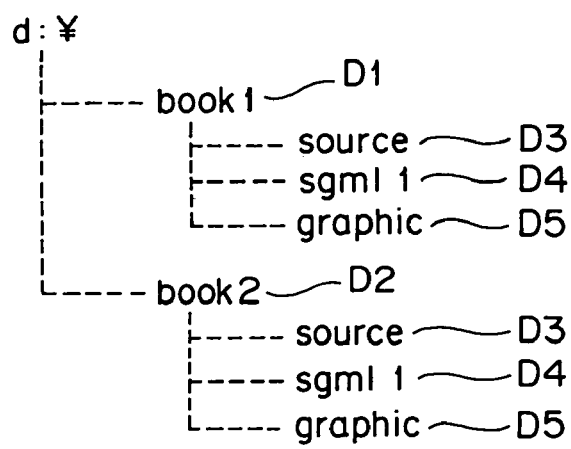
FIG. 3 is a diagrammatic view showing a structure of a directory formed on a hard disk of the system (computer system)

FIG. 1 illustrates a hub document preparation method according to an embodiment of the present invention. FIG. 2 illustrates a configuration of a system (computer system 10) to which the present invention is applied. FIG. 3 shows a structure of a directory formed on a hard disk 12 of the system.

Referring first to FIG. 2, the computer system shown is generally denoted at computer system 10 and includes a CPU (Central Processing Unit) 11, a hard disk 12, a memory 13, an interface 14, a keyboard 15, a mouse 16, a display unit 17 and a bus 18. The computer system 10 is used to prepare an SGML (Standard Generalized Markup Language) document which is a kind of structured document.

The computer system 10 has a function as a word processor and stores a word processor document (non-structured document) prepared by the word processor using the keyboard 15 and the mouse 16 onto the hard disk 12.

It is to be noted that, in the present embodiment, the MS-Word of Microsoft is used as the word processor. However, the word processor is not limited to this and any suitable word processor may be used as such.

The memory 13 is an area to be used for expansion of data and so forth when the CPU 11 performs various arithmetic processes, and is formed from, for example, a RAM (Random Access Memory) or a like element.

The interface 14 allows communication of data between the computer system 10 and an external apparatus and is formed from, for example, a communication port or a like element.

The keyboard 15 and the mouse 16 serve as inputting means for being operated by a preparing person of an SGML document to input a document, various instructions and so forth and perform selection and so forth therethrough. The display unit 17 displays a result of arithmetic processing by the CPU 11, an SGML document being prepared and so forth.

The hard disk 12 stores various data and other necessary information, and a hub document 100 prepared in such a manner as hereinafter described and SGML documents of the hub document format (hub document format structured documents) prepared based on the hub document 100 are recorded onto the hard disk 12. It is to be noted that an SGML document of the hub document format is hereinafter referred to as hub document format SGML document.

An SGML document (hub document format SGML document) is a structured document prepared in accordance with a predetermined DTD (Document Type Definition) and, for example, is recorded on the hard disk 12 and includes an SGML declaration, a DTD and a document instance.

The SGML declaration describes various references regarding a type of a character code used in the document, determination of whether or not an end tag can be omitted, and so forth. The document instance represents contents of the document.

The DTD defines a structure of the document and gives arbitrary significance to document structure elements to define the document structure elements, and describes an order of appearance of the document structure elements, hierarchical relationships between different document structure elements, a number of times of repetition of each document structure element, and so forth. The DTD defines elements which form the document and mutual relationships of the elements, that is, hierarchical relationships and referencing relationships, using an element declaration (ELEMENT statement) and/or an entity declaration (ENTITY statement).

Figure 8:
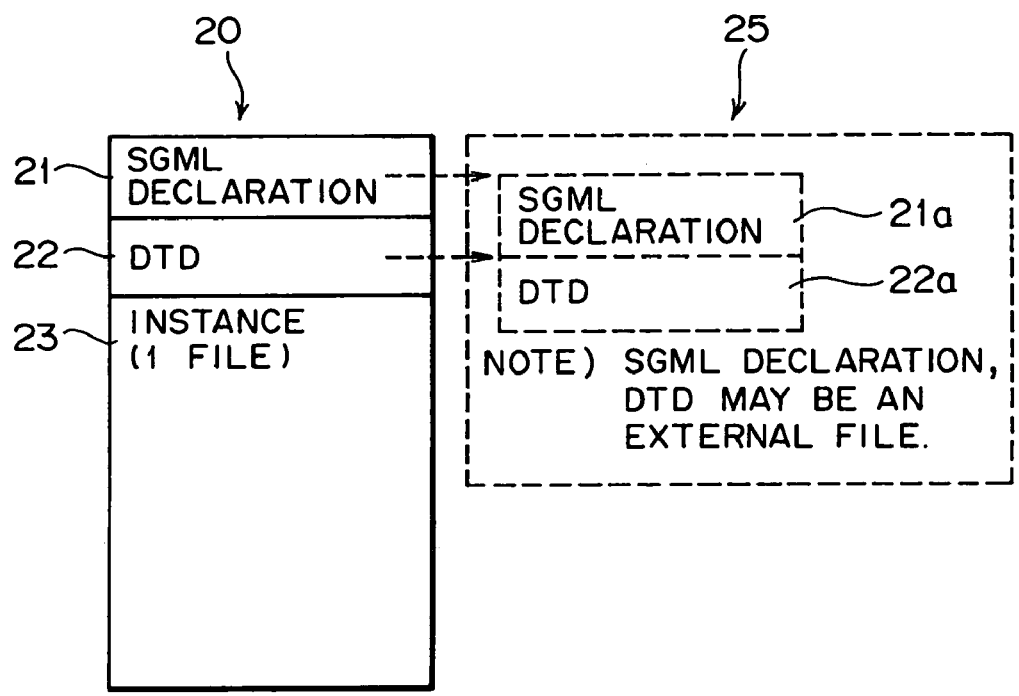
FIG. 8 is a diagrammatic view showing a structure of an SGML document.
Figure 9:
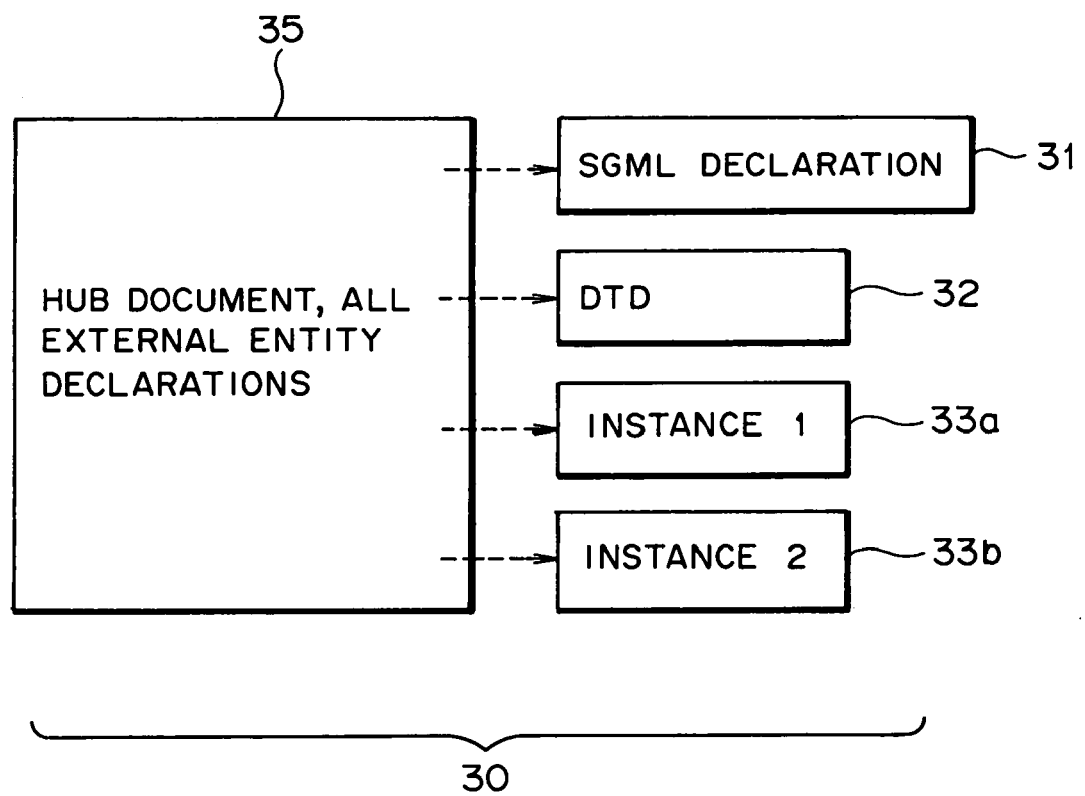
FIG. 9 is a diagrammatic view showing a structure of an SGML document (hub document) of a hub document format.

In the hub document 100 prepared by the hub document preparation method of the present embodiment, similarly as in the hub document 35 shown in FIG. 8, contents of the SGML declaration and the DTD are prepared and described in external files (external entities), and an SGML document of a hub document format is prepared by designating one of the external files (external entity declarations).

The external files which describe contents of the SGML declaration and the DTD are stored on the hard disk 12.

Referring now to FIG. 1, the hard disk 12 has formed thereon an original document storage area 1 for storing a non-structured document, a structured document storage area 2 for storing a structured document obtained by conversion of the non-structured document, and an attachment file storage area 3 for storing, where the non-structured document has an attachment file attached thereto, the attachment file and an entity declaration regarding the attachment file.

More particularly, the hard disk 12 has formed thereon as shown in FIG. 3 directories such as a book1 directory D1 and a book2 directory D2 for individual SGML documents to be prepared. Such book1 directory D1 and book2 directory D2 are set in advance by a preparing person or the like.

Each of the directories such as the book1 directory D1 and the book2 directory D2 has a source directory D3, an sgml directory D4 and a graphic directory D5 formed therein.

The source directory D3 is provided for storing a document format (non-structured document) unique to the word processor before conversion and functions as the original document storage area 1 shown in FIG. 1. The sgml directory D4 stores an SGML document (document instance; structured document) obtained by conversion of the word processor document (non-structured document) and functions as the structured document storage area 2 shown in FIG. 1.

The graphic directory D5 stores, where a graphic file is attached (added) to the word processor document before conversion into an SGML document, a copy of the file (graphic file) attached and stores an entity declaration regarding the graphic file added to the word processor document as hereinafter described, and functions as the attachment file storage area 3 shown in FIG. 1. It is to be noted that a file attached to a word processor document is hereinafter referred to as attachment file.

The CPU 11 performs various arithmetic processing and SGML document preparation processing using data stored on the hard disk 12 and the memory 13 in accordance with instructions inputted from the keyboard 15 and the mouse 16, and controls the interface 14, the display unit 17 and other pertaining components.

Further, upon preparation of the hub document 100, the CPU 11 sets the original document storage area (source directory D3) 1, the structured document storage area (sgml directory D4) 2 and the attachment file storage area (graphic directory D5) 3 in advance on the hard disk 12. Furthermore, each time a preparing person prepares or edit a non-structured document on the word processor, the CPU 11 stores the thus prepared non-structured document into the source directory D3. In addition, if the non-structured document has an attachment file added thereto, then the CPU 11 stores the attachment file into the attachment file storage area (graphic directory D5) 3, and prepares an entity declaration for referring to the entity of the attachment file and stores the prepared entity declaration as an ENTITY file into the attachment file storage area (graphic directory D5) 3.

When an entity declaration regarding an attachment file is stored as an ENTITY file into the graphic directory D5, the CPU 11 uses, for the file of the entity declaration (ENTITY FILE) a file name same as the file name of the word processor document (non-structured document) to which the attached document is attached. Further, the CPU 11 uses, for the entity declaration regarding each structured document, a file name same as the file name of the original word processor corresponding to the structured document.

Further, the CPU 11 converts a plurality of non-structured documents stored in the source directory D3 into SGML documents, stores the SGML documents after the conversion into the sgml directory D4, acquires file names (document names) of the plurality of SGML documents stored in the sgml directory D4 and prepare entity declarations for referring to the entities of the individual SGML documents.

Then, the CPU 11 extracts entity declarations regarding attachment files stored as ENTITY files in the graphic directory D5 and prepares the hub document 100 based on the entity declarations regarding the SGML documents and the entity declarations regarding the attachment files.

Further, in the present embodiment, the CPU 11 executes a program stored on the hard disk 12 to perform the processes described above to prepare the single hub document 100 from a plurality of non-structured documents. For example, a macro of a word processor, add-on software or the like functions as such program.

FIG. 6 illustrates an example of description of the hub document 100 prepared by the hub document preparation method of the present embodiment. Referring to FIG. 6, the hub document 100 illustrated declares and refers as external entities to contents described in an external file of front.sgm under the entity name "front.sgm", contents described in another external file of t0000010.sgm under the entity name "t0000010.sgm", graphic data stored in an attachment file of danger.gif under the entity name "danger.gif", graphic data stored in another attachment file of warning.gif under the entity name "danger.gif, graphic data stored in a further attachment file of caution.gif under the entity name "caution.gif", and graphic data stored in a still further attachment file of FUJITSU.gif under the entity name "FUJITSU.gif".

Further, the hub document 100 illustrated in FIG. 6 refers (external entity reference) to, as document instances, contents described in an external file of front.sgm under the entity name "front.sgm" and contents described in another external file of t0000010.sgm under the entity name "t0000010.sgm".

It is to be noted that the hub document 100 (a hub document format SGML document) prepared by the present method may be recorded not only onto the hard disk 12 but also to various recording media including a flexible disk, a CD-ROM, an optical disk, a magneto-optical disk and a magnetic tape in a similar manner as in the present embodiment and transported or stored as such.

Figure 4:
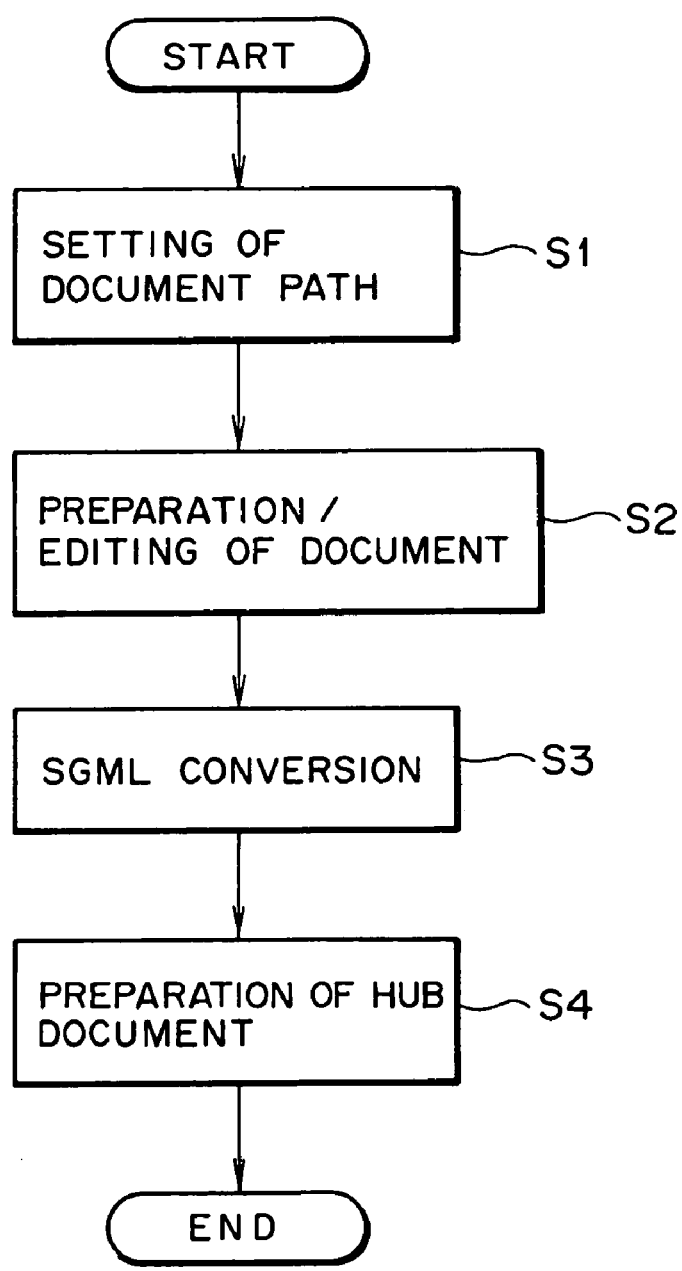
FIG. 4 is a flow chart illustrating the hub document preparation method according to the embodiment of the present invention.
Figure 5:
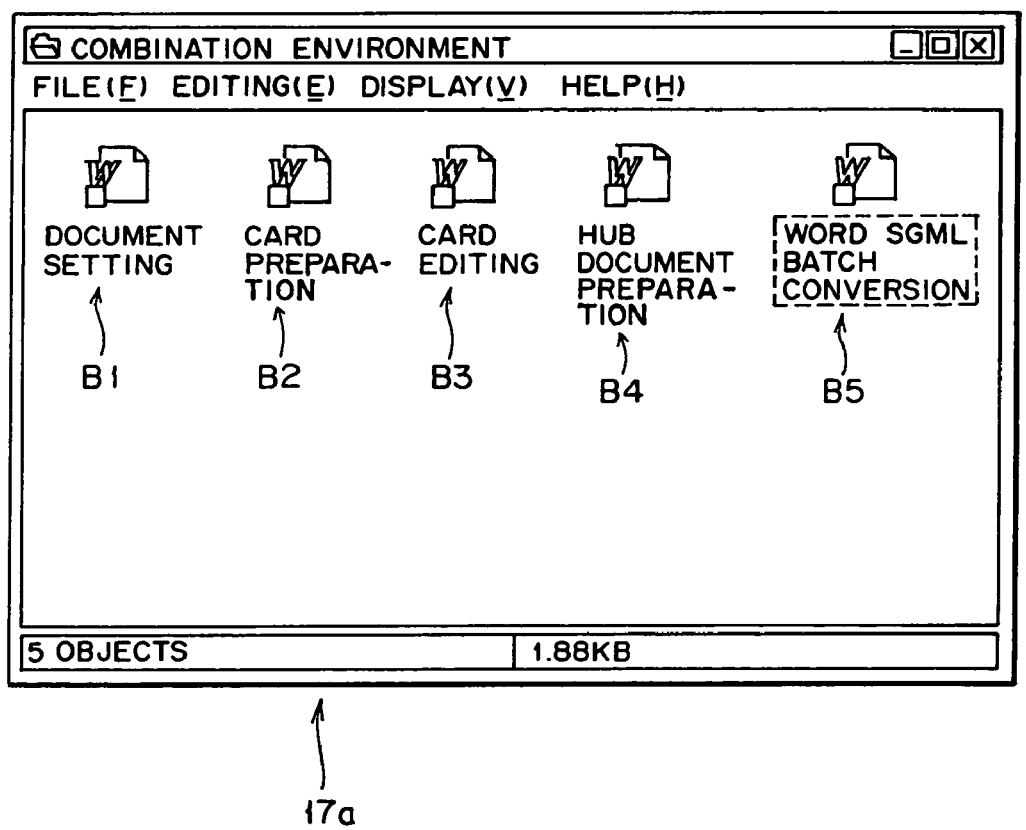
FIG. 5 is a schematic view showing an example of a screen display of a display unit of the system (computer system)

Subsequently, the hub preparation method of the present embodiment executed on the computer system 10 having the construction described above is described specifically with reference to a flow chart (steps S1 to S4) shown in FIG. 4.

In the present embodiment, processes in steps S1 to S4 described below are performed to prepare the hub document 100 for preparing a single hub document format SGML document from a plurality of non-structured documents prepared on a word processor.

The processes in steps S1 to S4 are executed by execution of programs stored on the hard disk 12. According to the programs, icons B1 to B5 for execution of such programs are displayed on a display screen 17a of the display unit 17 such that the preparing person can select any of the icons B1 to B5 to perform desired processing. It is to be noted that the hub document 100 to be prepared may sometimes be referred to simply as document.

In order to prepare the hub document 100, the preparing person first uses the keyboard 15, mouse 16 and so forth to select the "document setting" icon B1 to effect document path setting (step S1).

The document path setting is a process for linking the document name of a document to be prepared (the hub document 100) and a directory for storage of the prepared document with each other and, for example, a process of linking the book1 directory D1 or the book2 directory D2 illustrated in FIG. 3 and a name of the document to be prepared. More specifically, in the document path setting, the preparing person inputs a document name and a directory (document path) corresponding to the document name in accordance with instructions displayed on the display screen 17a of the display unit 17.

Then, the document preparing person uses the mouse 16 and so forth to select the "card preparation" icon B2 or the "card editing" icon B3 to perform document preparation/editing of the document (step S2).

The document preparation/editing is preparation and/or editing of a non-structured document on the word processor. In the present embodiment, the document names set in step S1 are displayed on the display screen 17a, and the preparing person selects a document to be prepared or edited from among the documents and then prepares a word processor document which forms the selected document.

If the preparing person adds, upon preparation of the word processor document, a graphic file to the word processor document by executing a cut-and-paste operation of an attachment file such as a graphic file to the word processor document, then the CPU 11 copies the added graphic file into the book1 directory D1 (attachment file storage area 3), prepares an ENTITY statement for declaring the entity of the graphic file, and stores the ENTITY statement as an ENTITY file having a file name same as the file name of the non-structured document to which the graphic file is added into the graphic directory D5 (attachment file storage area 3).

For example, if the preparing person pastes a graphic file named "danger.gif" to a word processor document having a file name of "front.doc", then the CPU 11 copies the graphic file named "danger.gif" into the graphic directory D5, prepares an ENTITY statement for declaring the entity of the graphic file named "danger.gif" (for example, '<!ENTITY danger.gif system "danger.gif" ndata GIF>'), and stores the ENTITY statement as an ENTITY file named "front.ent" into the graphic directory D5.

Further, if another attachment file is added to the word processor document (front.doc) later, then each time an attachment file is added, an ENTITY statement for declaring the entity of the attachment file is added to the ENTITY file named "front.ent".

It is to be noted that, when the preparing person selects a document to be prepared or edited, copies of word processor documents and graphic files and so forth produced before the document preparation/editing is completed are stored into the respective directories (source directory D3, sgml directory D4 and graphic directory D5) formed in the directory (for example, book1 directory D1) designated in step S1, but are not stored into the directories (source directory D3, sgml directory D4 and graphic directory D5) of any other document (the book2 directory D2).

The preparing person having prepared required word processor documents (non-structured documents) uses the mouse 16 or the like to select the "WORD SGML batch conversion" icon B4 to convert the prepared non-structured documents into SGML documents (step S3).

More particularly, the CPU 11 converts all of the non-structured documents stored in the source directory D3 into SGML documents and stores all of the thus prepared SGML documents as SGML documents having file names same as the file names of the respective original non-structured documents into the sgml directory D4.

For example, if a non-structured document named "front.doc" is stored in the source directory D3, then the CPU 11 converts the document "front.doc" into an SGML document (SGML instance) and stores the SGML document after the conversion into the sgml directory D4 with the name "front.sgm" added to the same.

Then, the preparing person uses the mouse 16 or the like to select the "hub document preparation" icon B5 to automatically prepare a hub document (step S4).

The automatic preparation of a hub document in step S4 is performed in accordance with a process including the following steps 1) to 4).

1) The CPU 11 first acquires a list of file names of the SGML instances stored in the sgml directory D4 and prepares an ENTITY statement regarding each of the SGML instances.

For example, if a file named "front.sgm" is stored in the sgml directory D4, then the CPU 11 prepares an ENTITY statement (for example, '<!ENTITY front.sgm system "front.sgm">') for declaring the entity of the file "front.sgm".

2) Then, the CPU 11 successively extracts the ENTITY statements prepared in step S2 and stored in the ENTITY files of the graphic directory D5 and adds them to the last ends of the ENTITY statements prepared in 1) above.

For example, the CPU 11 adds an ENTITY statement '<!ENTITY danger.gif system "danger.gif" ndata GIF>'stored in an ENTITY file named "front.ent" in the graphic directory D5 to the last end of the ENTITY statement prepared in 1) above.

3) Further, the CPU 11 adds an entity reference statement for referring to the entity of an SGML instance stored in the sgml directory D4, as a document instance of the hub document 100, to the last end of the ENTITY document added in 2) above.

For example, if an SGML instance named "front.sgm" is stored in the sgml directory D4, then the CPU 11 adds an entity reference statement (&front.sgm;).

4) Then, a DOCTYPE declaration statement is added to the top of the hub document prepared in 1) to 3) above.

It is to be noted that the DOCTYPE declaration statement may be prepared as a fixed prototype in advance.

In this manner, according to the hub document preparation method as the embodiment of the present invention, a directory such as the book1 directory D1 and the book2 directory D2 is formed for each SGML document to be prepared on the hard disk 12, and the source directory D3, sgml directory D4 and graphic directory D5 are formed in each of the book1 directory D1 and the book2 directory D2. Further, a document (non-structured document) of a document format unique to a word processor before conversion is stored into the source directory D3 whereas an SGML document (document instance) after conversion is stored into the sgml directory D4. Furthermore, where an attachment file is to be added to the word processor document before the conversion into an SGML document, a copy of the attachment file is stored into the graphic directory D5. Consequently, upon preparation of the hub document 100, the CPU 11 is required only to refer to predetermined directories. Consequently, the hub document 100 can be prepared readily at a high speed.

In particular, from a list of file names of SGML instances stored in the sgml directory D4, an ENTITY statement or an entity reference statement regarding each SGML instance can be prepared readily. Further, since all attachment files to be referred to by the SGML instances are stored in the graphic directory D5, the attachment files can be managed readily.

For example, when it is intended to edit a graphic file used in the hub document 100 upon editing of the hub document 100 or the like, the attachment file of the object of editing can be searched out readily from the graphic directory D5. Also when it is intended to edit an SGML instance, the SGML instance of the object of editing can be searched out readily from the sgml directory D4.

Further, when, upon preparation of a word processor document, an attachment file such as a graphic file is patched to the word processor document to add the graphic file to the word processor document, the CPU 11 prepares an ENTITY statement for declaring the entity of the graphic file, stores the ENTITY statement as an ENTITY file having a file name same as the file name of the word processor document, to which the graphic file is added, into the graphic directory D5, and extracts, upon preparation of the hub document 100, the ENTITY statement stored in the ENTITY file. Consequently, the hub document 100 can be prepared readily and rapidly.

Furthermore, since here the ENTITY statement for declaring the entity of the graphic file is stored as an ENTITY file having a file name same as the file name of the word processor document, to which the graphic file is added, into the graphic directory D5, for example, when editing, search for bugs or the like is performed for the hub document 100, an entity declaration or the like regarding a desired attachment file can be searched out readily. Consequently, the operation efficiency is augmented and management of such files is facilitated.

Further, since the CPU 11 stores, after it converts all non-structured documents stored in the source directory D3 into SGML documents, all of the thus prepared SGML documents as SGML documents of file names same as the file names of the non-structured documents into the sgml directory D4, for example, when editing, search for bugs or the like is performed for the hub document 100, a desired SGML instance can be searched out readily. Consequently, the working efficiency is augmented and management after preparation of the hub document 100 is facilitated.

Furthermore, since an SGML document which combines a plurality of document instances can be prepared as the hub document 100, the individual document instances can be prepared separately from one another and SGML documents can be prepared separately by a plurality of preparing persons, the efficiency in preparation of SGML documents is augmented.

It is to be noted that, while, in the embodiment described above, the hub document 100 is prepared in steps S1 to S4 in this order, the order in which steps S1 to S4 are to be executed is not limited to this, and they may be executed in any order.

The present invention is not limited to the embodiment specifically described above, and variations and modifications can be made without departing from the scope of the present invention.

For example, while, in the embodiment described above, an attachment file is a graphic file, it is not limited to this and may be any of sound files, program files and so forth.

Figure 7:
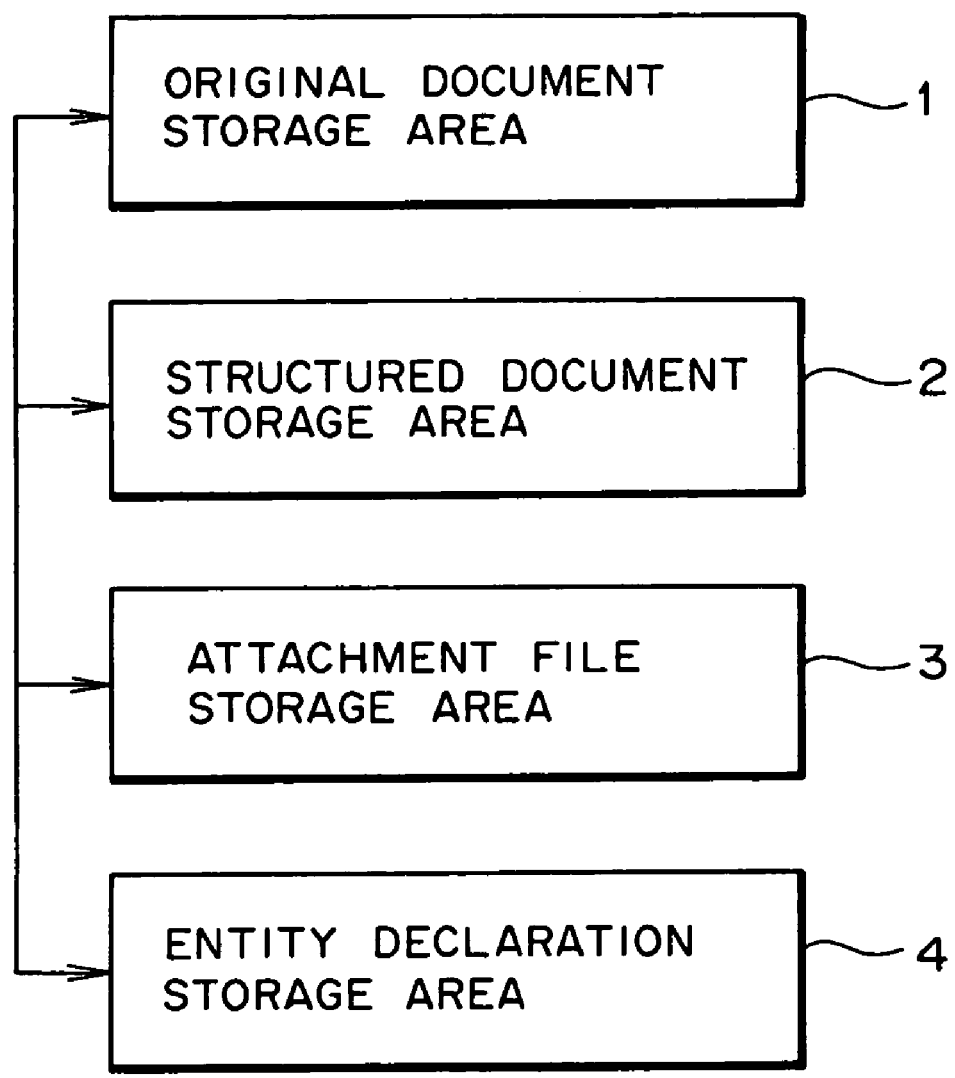
FIG. 7 is a diagrammatic view illustrating a modification to the hub document preparation method according to the embodiment of the present invention.

Further, while, in the embodiment described above, the graphic directory director D5 functions as the attachment file storage area 3 for storing an attachment file attached to a non-structured document and an entity declaration regarding the attachment file, it is not limited to this. For example, as seen from FIG. 7 which illustrates a modification to the hub document preparation method of the present embodiment, an entity declaration storage area 4 for storing an entity declaration regarding an attachment file may be provided additionally while the attachment file attached to a non-structured document is stored in the attachment file storage area 3.

More particularly, a graphic directory D5 formed on the hard disk 12 is used as the attachment file storage area 3, and further, a directory for storing an entity declaration regarding an attachment file is formed on the hard disk 12. The newly prepared directory may be used as the entity declaration storage area 4.

With the modification just described, similar effects to those of the embodiment described above can be achieved.

Besides, since, upon preparation of a hub document, an entity declaration stored in the entity declaration storage area 4 can be extracted readily, a hub document can be prepared rapidly and readily, and the working burden to the preparing person is reduced and the working efficiency is augmented.

Further, in the embodiment described above, such a directory as the book1 directory D1 or the book2 directory D2 is formed for each SGML document to be prepared, and the source directory D3, sgml directory D4 and graphic directory D5 are formed in each of the book1 directory D1 and the book2 directory D2 such that documents of a format (non-structured documents) unique to a word processor before conversion are stored into the source directory D3 and SGML documents (document instances) after conversion are stored into the sgml directory D4 whereas copies of attachment files are stored into the graphic directory D5. However, the directory names and directory structures of the directories are not limited to them and may be determined arbitrarily.

Furthermore, while, in the embodiment described above, description is given only of a case wherein a structured document is an SGML document, it is not limited to this and may alternatively be an XML (Extended Markup Language) document.

What is claimed is:

1. A hub document preparation method, for use in a computer system having a file system to manage data by storing the data in a file-system directory, for preparing a hub document which describes entity declarations for referring to entities of documents individually corresponding to a plurality of non-structured documents in order to prepare a single hub document format structured document from the plurality of non-structured documents, the method comprising:

setting in advance one original document file-system directory for storing the plurality of non-structured documents and one structured document file-system directory for storing a plurality of structured documents obtained by conversion of the plurality of non-structured documents;

storing, each time one of the plurality of non-structured documents to be included in the hub document format structured document is prepared or edited, the one of the plurality of non-structured document into the original document file-system directory;

converting the plurality of non-structured documents stored in the original document file-system directory into the plurality of structured documents and storing the plurality of structured documents into the structured document file-system directory;

determining whether each of the plurality of structured documents is present in the structured document file-system directory; and in response to the presence of each of the plurality of structured documents in the structured document file-system directory, automatically adding the entity declarations to the hub document by acquiring document names of each of the plurality of structured documents stored in the structured document file-system directory and preparing corresponding entity declarations referring to each of the plurality of structured documents stored in the structured document file-system directory.

2. A hub document preparation method as claimed in claim 1, wherein, in addition to the original document file-system directory and the structured document file-system directory, an attachment file file-system directory for storing attachment files attached to the non-structured documents and entity declarations regarding the attachment files is set in advance, and, upon preparation or editing of any of the plurality of structured documents to be included in the hub document format structured document, if an attachment file is attached to the non-structured document, then the attachment file is stored into the attachment file file-system directory and an entity declaration for referring to an entity of the attachment file is prepared and stored into the attachment file file-system directory, and then the entity declarations regarding the attachment files stored in the attachment file file-system directory are extracted and the hub document is prepared based on the entity declarations regarding the attachment files and the entity declarations regarding the structured documents.

3. A hub document preparation method as claimed in claim 2, wherein the entity declarations of the structured documents have file names corresponding to file names of the original non-structured documents individually corresponding to the structured documents.

4. A hub document preparation method as claimed in claim 3, wherein the entity declarations regarding the attachment files stored in the entity declaration file-system directory have file names corresponding to file names of the non-structured documents to which the attachment files are attached.

5. A hub document preparation method as claimed in claim 4, wherein the attachment files are graphic files each of which includes graphic information.

6. A hub document preparation method as claimed in claim 5, wherein the structured documents are Standard Generalized Markup Language documents whose document structure is defined by a Document Type Definition.

7. A hub document preparation method as claimed in claim 4, wherein the structured documents are Standard Generalized Markup Language documents whose document structure is defined by a Document Type Definition.

8. A hub document preparation method as claimed in claim 3, wherein the attachment files are graphic files each of which includes graphic information.

9. A hub document preparation method as claimed in claim 8, wherein the structured documents are Standard Generalized Markup Language documents whose document structure is defined by a Document Type Definition.

10. A hub document preparation method as claimed in claim 3, wherein the structured documents are Standard Generalized Markup Language documents whose document structure is defined by a Document Type Definition.

11. A hub document preparation method as claimed in claim 2, wherein the entity declarations regarding the attachment files stored in the entity declaration file-system directory have file names corresponding to file names of the non-structured documents to which the attachment files are attached.

12. A hub document preparation method as claimed in claim 11, whereto the attachment files are graphic files each of which includes graphic information.

13. A hub document preparation method as claimed in claim 12, wherein the structured documents are Standard Generalized Markup Language documents whose document structure is defined by a Document Type Definition.

14. A hub document preparation method as claimed in claim 11, wherein the structured documents are Standard Generalized Markup Language documents whose document structure is defined by a Document Type Definition.

15. A hub document preparation method as claimed in claim 2, whereto the attachment files are graphic files each of which includes graphic information.

16. A hub document preparation method as claimed in claim 15, wherein the structured documents are Standard Generalized Markup Language documents whose document structure is defined by a Document Type Definition.

17. A hub document preparation method as claimed in claim 2, wherein the structured documents are Standard Generalized Markup Language documents whose document structure is defined by a Document Type Definition.

18. A volatile or non-volatile computer-readable storage storing information for a computer to perform a method according to claim 2.

19. A hub document preparation method as claimed in claim 1, wherein, in addition to the original document file-system directory and the structured document file-system directory, an attachment file file-system directory for storing attachment files attached to the non-structured documents and an entity declaration file-system directory for storing entity declarations regarding the attachment files are set in advance, and, upon preparation or editing of any of the plurality of non-structured documents to be included in the hub document format structured document, if an attachment file is attached to the non-structured document, then the attachment file is stored into the attachment file file-system directory and an entity declaration for referring to an entity of the attachment file is prepared and stored into the attachment file file-system directory, and then the entity declarations regarding the attachment files stored in the entity declaration file-system directory are extracted and the hub document is prepared based on the entity declarations regarding the attachment files and the entity declarations regarding the structured documents.

20. A hub document preparation method as claimed in claim 19, wherein the entity declarations of the structured documents have file names corresponding to file names of the original non-structured documents individually corresponding to the structured documents.

21. A hub document preparation method as claimed in claim 20, wherein the entity declarations regarding the attachment files stored in the entity declaration file-system directory have file names corresponding to file names of the non-structured documents to which the attachment files are attached.

22. A hub document preparation method as claimed in claim 21, wherein the attachment files are graphic files each of which includes graphic information.

23. A hub document preparation method as claimed in claim 22, wherein the structured documents are Standard Generalized Markup Language documents whose document structure is defined by a Document Type Definition.

24. A hub document preparation method as claimed in claim 21, wherein the structured documents are Standard Generalized Markup Language documents whose document structure is defined by a Document Type Definition.

25. A hub document preparation method as claimed in claim 20, wherein the attachment files are graphic files each of which includes graphic information.

26. A hub document preparation method as claimed in claim 25, wherein the structured documents are Standard Generalized Markup Language documents whose document structure is defined by a Document Type Definition.

27. A hub document preparation method as claimed in claim 20, wherein the structured documents are Standard Generalized Markup Language documents whose document structure is defined by a Document Type Definition.

28. A hub document preparation method as claimed in claim 19, wherein the entity declarations regarding the attachment files stored in the entity declaration file-system directory have file names corresponding to file names of the non-structured documents to which the attachment files are attached.

29. A hub document preparation method as claimed in claim 28, wherein the attachment files are graphic files each of which includes graphic information.

30. A hub document preparation method as claimed in claim 29, wherein the structured documents are Standard Generalized Markup Language documents whose document structure is defined by a Document Type Definition.

31. A hub document preparation method as claimed in claim 28, wherein the structured documents are Standard Generalized Markup Language documents whose document structure is defined by a Document Type Definition.

32. A hub document preparation method as claimed in claim 19, whereto the attachment files are graphic files each of which includes graphic information.

33. A hub document preparation method as claimed in claim 32, wherein the structured documents are Standard Generalized Markup Language documents whose document structure is defined by a Document Type Definition.

34. A hub document preparation method as claimed in claim 19, wherein the structured documents are Standard Generalized Markup Language documents whose document structure is defined by a Document Type Definition.

35. A volatile or non-volatile computer-readable storage storing information for a computer to perform a method according to claim 19.

36. A hub document preparation method as claimed in claim 1, wherein the entity declarations of the structured documents have file names corresponding to file names of the original non-structured documents individually corresponding to the structured documents.

37. A hub document preparation method as claimed in claim 36, wherein the entity declarations regarding the attachment files stored in the entity declaration file-system directory have file names corresponding to file names of the non-structured documents to which the attachment files are attached.

38. A hub document preparation method as claimed in claim 37, wherein the attachment files are graphic files each of which includes graphic information.

39. A hub document preparation method as claimed in claim 38, wherein the structured documents are Standard Generalized Markup Language documents whose document structure is defined by a Document Type Definition.

40. A hub document preparation method as claimed in claim 37, wherein the structured documents are Standard Generalized Markup Language documents whose document structure is defined by a Document Type Definition.

41. A hub document preparation method as claimed in claim 36, wherein the attachment files are graphic files each of which includes graphic information.

42. A hub document preparation method as claimed in claim 41, wherein the structured documents are Standard Generalized Markup Language documents whose document structure is defined by a Document Type Definition.

43. A hub document preparation method as claimed in claim 36, wherein the structured documents are Standard Generalized Markup Language documents whose document structure is defined by a Document Type Definition.

44. A volatile or non-volatile computer-readable storage storing information for a computer to perform a method according to claim 36.

45. A hub document preparation method as claimed in claim 1, wherein the entity declarations regarding the attachment files stored in the entity declaration file-system directory have file names corresponding to file names of the non-structured documents to which the attachment files are attached.

46. A hub document preparation method as claimed in claim 45, wherein the attachment files are graphic files each of which includes graphic information.

47. A hub document preparation method as claimed in claim 46, wherein the structured documents are Standard Generalized Markup Language documents whose document structure is defined by a Document Type Definition.

48. A hub document preparation method as claimed in claim 45, wherein the structured documents are Standard Generalized Markup Language documents whose document structure is defined by a Document Type Definition.

49. A volatile or non-volatile computer-readable storage storing information for a computer to perform a method according to claim 45.

50. A hub document preparation method as claimed in claim 1, wherein the attachment files are graphic files each of which includes graphic information.

51. A hub document preparation method as claimed in claim 50, wherein the structured documents are Standard Generalized Markup Language documents whose document structure is defined by a Document Type Definition.

52. A volatile or non-volatile computer-readable storage storing information for a computer to perform a method according to claim 50.

53. A hub document preparation method as claimed in claim 1, wherein the structured documents are Standard Generalized Markup Language documents whose document structure is defined by a Document Type Definition.

54. A volatile or non-volatile computer-readable storage storing information for a computer to perform a method according to claim 53.

55. A volatile or non-volatile computer-readable storage storing information for a computer to perform a method according to claim 1.

56. A hub document preparation apparatus, for use in a computer system having a file system to manage data by storing the data in a file-system directory, for preparing a hub document which describes entity declarations for referring to entities of documents individually corresponding to a plurality of non-structured documents in order to prepare a single hub document format structured document from the plurality of non-structured documents, the apparatus comprising:

one original document file-system directory setting in advance and storing the plurality of non-structured documents and one structured document file-system directory storing a plurality of structured documents obtained by conversion of the plurality of non-structured documents, where each time one of the plurality of non-structured documents to be included in the hub document format structured document is prepared or edited, the one of the plurality of non-structured documents is stored into the original document file-system directory, where the plurality of non-structured documents stored in the original document file-system directory are converted into the plurality of structured documents and the plurality of structured documents are stored into the structured document file-system directory;

a determining unit determining whether each of the plurality of structured documents is present in the structured document file-system directory; and an entity declarations adding unit, in response to the presence of each of the plurality of structured documents in the structured document file-system directory, automatically adding the entity declarations to the hub document by acquiring document names of each of the plurality of structured documents stored in the structured document file-system directory and preparing corresponding entity declarations referring to each of the plurality of structured documents stored in the structured document file-system directory.

57. A hub document preparation apparatus as claimed in claim 56, wherein, in addition to the original document file-system directory and the structured document file-system directory, an attachment file file-system directory for storing attachment files attached to the non-structured documents and entity declarations regarding the attachment files is set in advance, and, upon preparation or editing of any of the plurality of structured documents to be included in the hub document format structured document, if an attachment file is attached to the non-structured document, then the attachment file is stored into the attachment file file-system directory and an entity declaration for referring to an entity of the attachment file is prepared and stored into the attachment file file-system directory, and then the entity declarations regarding the attachment files stored in the attachment file file-system directory are extracted and the hub document is prepared based on the entity declarations regarding the attachment files and the entity declarations regarding the structured documents.

58. A hub document preparation apparatus as claimed in claim 56, wherein, in addition to the original document file-system directory and the structured document file-system directory, an attachment file file-system directory for storing attachment files attached to the non-structured documents and an entity declaration file-system directory for storing entity declarations regarding the attachment files are set in advance, and, upon preparation or editing of any of the plurality of non-structured documents to be included in the hub document format structured document, if an attachment file is attached to the non-structured document, then the attachment file is stored into the attachment file file-system directory and an entity declaration for referring to an entity of the attachment file is prepared and stored into the attachment file file-system directory, and then the entity declarations regarding the attachment files stored in the entity declaration file-system directory are extracted and the hub document is prepared based on the entity declarations regarding the attachment files and the entity declarations regarding the structured documents.

59. A hub document preparation apparatus as claimed in claim 56, wherein the entity declarations of the structured documents have file names corresponding to file names of the original non-structured documents individually corresponding to the structured documents.

60. A hub document preparation apparatus as claimed in claim 56, wherein the entity declarations regarding the attachment files stored in the entity declaration file-system directory have file names corresponding to file names of the non-structured documents to which the attachment files are attached.

61. A hub document preparation apparatus as claimed in claim 56, wherein the attachment files are graphic files each of which includes graphic information.

62. A hub document preparation apparatus as claimed in claim 56, wherein the structured documents are Standard Generalized Markup Language documents whose document structure is defined by a Document Type Definition.

63. A hub document preparation method, comprising:

manually placing a plurality of unstructured document files in one pre-determined file-system directory;

when preparing the hub document, automatically responding to the presence of the plurality of unstructured document files in the one pre-determined file-system directory by converting the plurality of unstructured document files to a corresponding plurality of structured document files, where structure of the plurality of structured documents is given by markup tags included therein;

determining whether each of the plurality of structured document files is present in a structured document file-system directory;

determining structured documents to be referenced in the hub document by automatically acquiring a list of file names of the respective structured document files in the pre-determined file-system directory, preparing corresponding entity declarations, and adding same to the hub document, where except for the presence of each of the plurality of structured documents in the one pre-determined file-system directory, each of the plurality of structured documents would not be referenced in the hub document and where the presence of each of the plurality of structured documents in the pre-determined file-system is what determines that each of the plurality of structured documents are to be referenced in the document directory; and preparing the hub-document by, in response to the presence of each of the stored plurality of structured document files in the structured document file-system directory, automatically adding the entity declarations to the hub document.

\* \* \* \* \*

UNITED STATES PATENT AND TRADEMARK OFFICE
CERTIFICATE OF CORRECTION

PATENT NO.        : 7,281,204 B1                                    Page 1 of 1
APPLICATION NO.   : 09/447052
DATED             : October 9, 2007
INVENTOR(S)       : Seishi Suehira It is certified that error appears in the above-identified patent and that said Letters Patent is hereby corrected as shown below:

Col. 13, line 56, delete "whereto" and insert --wherein-- therefor.

Col. 14, line 2, delete "whereto" and insert --wherein-- therefor.

Col. 15, line 19, delete "whereto" and insert --wherein-- therefor.

Signed and Sealed this

Fifteenth Day of April, 2008

JON W. DUDAS
*Director of the United States Patent and Trademark Office*